United States Patent
Takagi et al.

(10) Patent No.: US 8,059,330 B2
(45) Date of Patent: Nov. 15, 2011

(54) PARTICLES FOR DISPLAY MEDIUM AND INFORMATION DISPLAY PANEL USING SAME

(75) Inventors: Koji Takagi, Kawasaki (JP); Osamu Shiino, Kiyose (JP); Taichi Kobayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 667 days.

(21) Appl. No.: 11/908,772

(22) PCT Filed: Mar. 14, 2006

(86) PCT No.: PCT/JP2006/305011
§ 371 (c)(1),
(2), (4) Date: Aug. 12, 2008

(87) PCT Pub. No.: WO2006/098315
PCT Pub. Date: Sep. 21, 2006

(65) Prior Publication Data
US 2010/0032698 A1    Feb. 11, 2010

(30) Foreign Application Priority Data

Mar. 16, 2005 (JP) ................................. 2005-074362
Mar. 29, 2005 (JP) ................................. 2005-094367

(51) Int. Cl.
G02B 26/00 (2006.01)
G09G 3/34 (2006.01)
G03G 17/04 (2006.01)

(52) U.S. Cl. ........................... 359/296; 345/107; 430/38

(58) Field of Classification Search ................. 359/296; 430/31–32; 345/107; 349/33, 38
See application file for complete search history.

(56) References Cited

U.S. PATENT DOCUMENTS

| | | | |
|---|---|---|---|
| 5,961,804 A | 10/1999 | Jacobson et al. | |
| 6,407,763 B1 | 6/2002 | Yamaguchi et al. | |
| 6,411,316 B1* | 6/2002 | Shigehiro et al. | 347/112 |
| 7,106,296 B1* | 9/2006 | Jacobson | 345/107 |
| 7,259,744 B2* | 8/2007 | Arango et al. | 345/107 |
| 2005/0088079 A1* | 4/2005 | Daniels | 313/504 |

FOREIGN PATENT DOCUMENTS

| | | |
|---|---|---|
| JP | 2001-516467 A | 9/2001 |
| JP | 2001-312225 A | 11/2001 |
| JP | 2002-131789 A | 5/2002 |
| JP | 2002-236299 A | 8/2002 |

OTHER PUBLICATIONS

European Search Report for EP 06 72 9045 dated Nov. 2, 2009.
European Office Action issued in European Application No. 06729045.2-1228 dated Jul. 14, 2011.

* cited by examiner

*Primary Examiner* — Dawayne Pinkney
(74) *Attorney, Agent, or Firm* — Sughrue Mion, PLLC

(57) ABSTRACT

In the particles for display media used for an information display panel, in which at least one group of display media are sealed between two opposed substrates, at least one of two substrates being transparent, and, in which the display media, to which an electrostatic field is applied, are made to move so as to display information such as an image, a material having electric properties of a semiconductor is provided on a surface of the particles. According to the invention, since use is made of the particle whose surface has electric properties of a semiconductor, it is possible to maintain stably a surface charge of the particle for display media. As a result, it is possible to obtain an information display panel having a stable information display state such as an image.

23 Claims, 5 Drawing Sheets

PARTICLES FOR DISPLAY MEDIUM AND INFORMATION DISPLAY PANEL USING SAME

TECHNICAL FIELD

The present invention relates to particles for display media used for an information display panel, in which at least one group of display media are sealed between two opposed substrates, at least one of two substrates being transparent, and, in which the display media, to which an electrostatic field is applied, are made to move so as to display information such as an image, and an image display panel using the particle for display media mentioned above.

RELATED ART

As an information display device substitutable for liquid crystal display (LCD), information display devices with the use of technology such as an electrophoresis method, an electro-chromic method, a thermal method, a dichroic-particles-rotary method and so on are proposed.

As for these information display devices, it is conceivable as inexpensive visual display device of the next generation from a merit having wide field of vision close to normal printed matter, having smaller consumption, or having a memory function, as compared with LCD, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252]

A surface charge of the particles is a fundamental feature of these display mechanisms, and thus it is necessary to stably maintain the surface charge of the particles so as to obtain a stable and highly precise display. However, since the surface charge of the particles is very unstable, it is easily reduced due to a surrounding circumstance such as humidity, and it is easily varied due to a contact or a friction with respect to the other substances. Moreover, if some kind of mass movement or deformation occur in the particles, a variation on the surface charge occurs. These variations on the surface charge closely relates to a variation of display state, as apparent from the display mechanisms mentioned above. Therefore, there is a drawback such that the display state becomes unstable by a long-term storage of a long-term use of the image display panel.

DISCLOSURE OF THE INVENTION

The present invention has for its object to eliminate the drawbacks mentioned above and to provide particles for display media and an information display panel using the particles for display media, which can maintain a surface charge stably and can stabilize an information display state such as an image for long periods.

According to the invention, particles for display media used for an information display panel, in which at least one group of display media are sealed between two opposed substrates, at least one of two substrates being transparent, and, in which the display media, to which an electrostatic field is applied, are made to move so as to display information such as an image, are characterized in that a material having electric properties of a semiconductor is provided on a surface of the particles.

As a preferred embodiment of the particle for display media according to the invention, there are cases: such that the material having electric properties of a semiconductor is a material having electron transport property; such that the material having electric properties of a semiconductor is a material having hole transport property; such that a particle surface having electric properties of electron transport property has an electric rectifying contact relation with respect to a contact surface of at least one of two opposed substrates; such that a particle surface having electric properties of hole transport property has an electric rectifying contact relation with respect to a contact surface of at least one of two opposed substrates; such that the particles having a particle surface of electric properties of electron transport property and the particles having a particle surface of electric properties of hole transport property, both particles having different charge characteristics with each other, are used together; and such that the material coated on the surface of the base particles is a metal or a metal oxide.

Moreover, as a preferred embodiment of the particles for display media according to the invention, there are cases: such that, if it is assumed that Fa is Fermi level on a surface of particles A having the particle surface of electric transport property, Fb is Fermi level on a surface of particles B having the particle surface of hole transport property, and Fs is Fermi level on a surface of the substrate to which the particles are contacted, the following relation is satisfied: Fa<Fs<Fb; such that a charge characteristic of the particles having the particle surface of electric properties of electron transport property is positive; such that a charge characteristic of the particles having the particle surface of electric properties of hole transport property is negative; and such that the particles are formed in such a manner that a surface of base particles is coated by a material having electron transport property or hole transport property.

Further, as a preferred embodiment of the particles for display media according to the invention, there are cases: such that, if it is assumed that Fc is Fermi level on a surface of the base particles having the particle surface of electric transport property, Fa is Fermi level on the particle surface, and Fs is Fermi level on a surface of the substrate to which the particles are contacted, the following relation is satisfied: Fc<Fa<Fs; such that, if it is assumed that Fc is Fermi level on a surface of the base particles having the particle surface of hole transport property, Fa is Fermi level on the particle surface, and Fs is Fermi level on a surface of the substrate to which the particles are contacted, the following relation is satisfied: Fc<Fa<Fs; such that the particles are constituted by a simple body of the material of electron transport property or the material of hole transport property; and such that the particles are constituted by dispersing the material of electron transport property or the material of hole transport property into a resin.

Furthermore, as a preferred embodiment of the particles for display media according to the invention, there is a case such that a surface of the particles is a laminated body of semiconductor materials.

Moreover, as a preferred embodiment of the particles for display media according to the invention, there are cases: such that a surface of at least one group of the particles is constituted by a material of electron transport property and an under layer of the surface is constituted by a material of hole transport property; such that the particles show a negative charge characteristic; such that a surface of at least one group of the particles is constituted by a material of hole transport property and an under layer of the surface is constituted by a material of electron transport property; such that the particles show a positive charge characteristic; and such that the substrate and the particle surface are an ohmic contact.

Further, according to the invention, an information display panel, in which at least one group of display media are sealed between two opposed substrates, at least one of two substrates being transparent, and, in which the display media, to which an electrostatic field is applied, are made to move so as to display information such as an image, is characterized in that display media constituted by the particles for display media mentioned above.

BEST MODE FOR CARRYING OUT THE INVENTION

Figure 1:
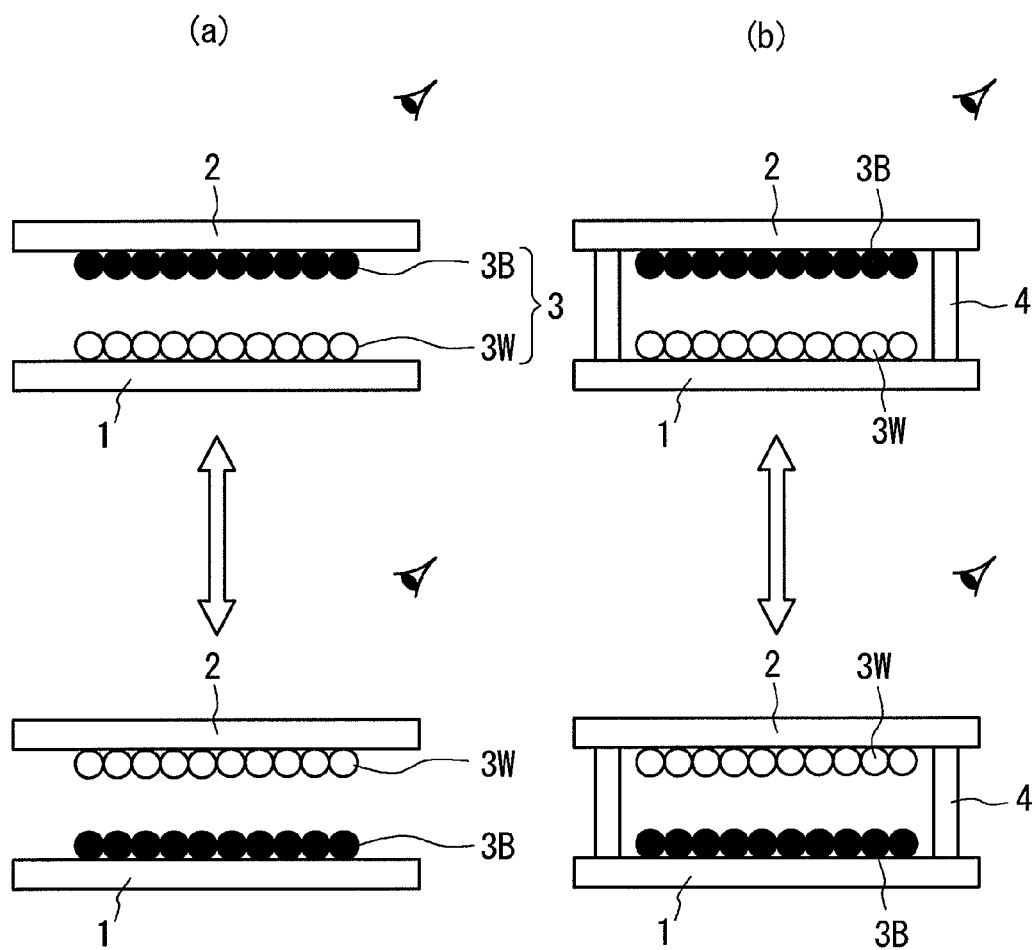
FIGS. 1a and 1b are schematic views respectively showing one embodiment of the information display panel using the particles for display media according to the invention as the display media.
Figure 2:
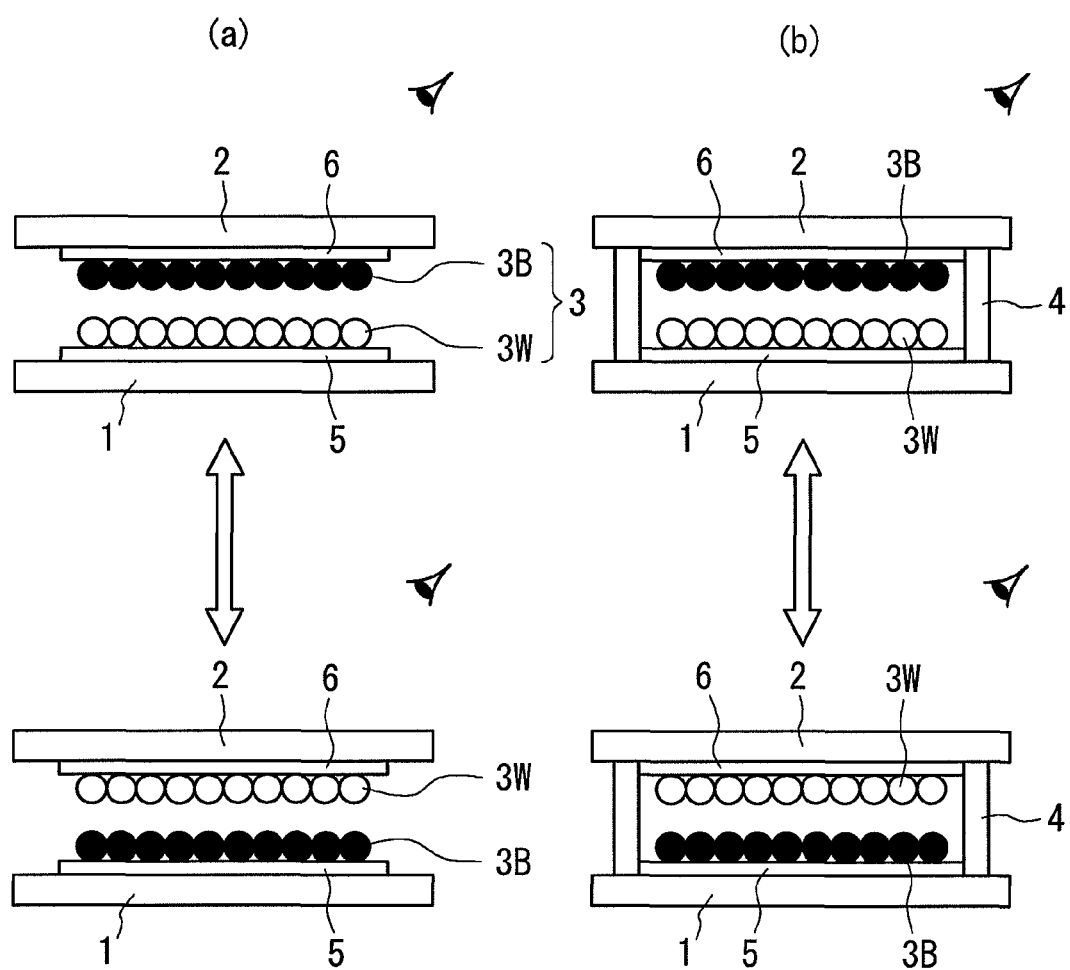
FIGS. 2a and 2b are schematic views respectively illustrating another embodiment of the information display panel using the particles for display media according to the invention as the display media.
Figure 3:
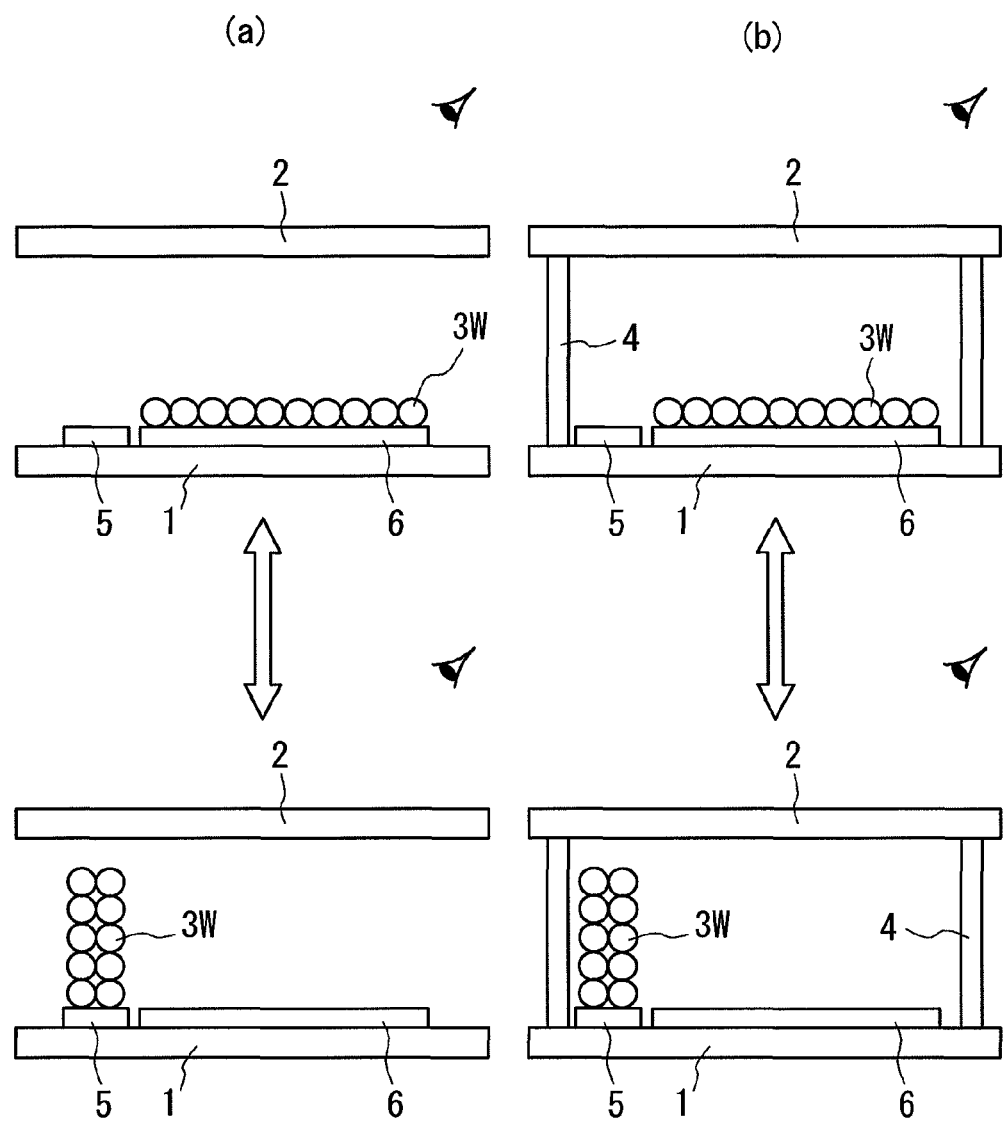
FIGS. 3a and 3b are schematic views respectively depicting still another embodiment of the information display panel using the particles for display media according to the invention as the display media.

At first, a basic construction of an information display panel using the display media constituted by the particles for display media according to the invention will be explained. In the information display panel using the particles according to the invention, an electrostatic field is applied to the display media sealed between opposed two substrates. Along a direction of the applied electrostatic field, charged display media are attracted by means of a force due to electrostatic field or Coulomb's force, and, the display media are moved reciprocally by varying a direction of the electrostatic field due to a potential switching, so that information such as an image can be displayed. Therefore, it is necessary to design the information display panel in such a manner that the display media can move evenly and maintain stability during a reciprocal operation or during a display information reserving state. Here, as to forces applied to the particles constituting the display media, there are an attraction force between the particles due to Coulomb's force, an imaging force with respect to the electrode or the substrate, an intermolecular force, a liquid bonding force and a gravity.

Examples of the information display panel using the particles according to the invention will be explained with reference to FIGS. 1a and 1b-FIGS. 3a and 3b.

In the examples shown in FIGS. 1a and 1b, at least two or more groups of display media 3 having different optical reflectance and different charge characteristics and consisting of at least one or more groups of particles (here, white color display media 3W constituted by the particles made of the white particles for display media and black color display media 3B constituted by the particles made of the black particles for display media are shown) are moved in a perpendicular direction with respect to substrates 1 and 2, in accordance with an electric field applied from outside of the substrates 1 and 2, so as to display a black color by viewing the black color display media 3B to an observer or so as to display a white color by viewing the white color display media 3W to the observer. In the example shown in FIG. 1b, a cell is formed by arranging for example grid-like partition walls 4 between the substrates 1 and 2, in addition to the example shown in FIG. 1a. Moreover, in FIG. 1b, the partition walls arranged at the near side are omitted.

In the examples shown in FIGS. 2a and 2b, at least two or more groups of display media 3 having different colors and different charge characteristics and comprising of at least one or more groups of particles (here, white color display media 3W constituted by the particles made of the white particles for display media and black color display media 3B constituted by the particles made of the black particles for display media are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color display media 3B to an observer or so as to display a white color by viewing the white color display media 3W to the observer. In the example shown in FIG. 2b, a cell is formed by arranging for example grid-like partition walls 4 between the substrates 1 and 2, in addition to the example shown in FIG. 2a. Moreover, in FIG. 2b, the partition walls arranged at the near side are omitted.

In the examples shown in FIGS. 3a and 3b, one group of display media 3 having one color and one charge characteristic and comprising of at least one or more groups of particles (here, white color display media 3W constituted by the particles made of the white particles for display media) is moved in a parallel direction with respect to substrates 1 and 2, in accordance with an electric field generated by applying a voltage between the electrode 5 arranged to the substrate 1 and the electrode 6 arranged to the substrate 1, so as to display a white color by viewing the white color display media 3W to an observer or so as to display a color of the electrode 6 or the substrate 1 by viewing a color of the electrode 6 or the substrate 1 to the observer. In the example shown in FIG. 3b, a cell is formed by arranging for example grid-like partition walls 4 between the substrates 1 and 2, in addition to the example shown in FIG. 3a. Moreover, in FIG. 3b, the partition walls arranged at the near side are omitted.

A first feature of the present invention is that a surface charge is maintained stably and a stable information display state such as an image having a high contrast can be obtained by using a material having electric properties of a semiconductor as the particles for display media.

As a preferred embodiment, the particles having a particle surface with electric properties of a semiconductor such as electron transport property and the particles having a particle surface with electric properties of a semiconductor such as hole transport property, in which electric properties of them are different respectively, are used independently or together according to a construction of the information display panel. In addition, these particle surfaces have an electric rectifying contact relation with respect to a contact surface of at least one of two opposed substrates. Hereinafter, effects and functions obtained in the case of using these materials will be explained.

As one example, a particle having electric properties of electron transport property is made to have an electric rectifying contact relation with respect to a contact surface of at least one of two opposed substrates. The electric rectifying contact means a contact such that, in the case of contacting different substances, electric properties do not correspond to Ohm's law, but a magnitude of electric charge flow has an orientation. Along a forward direction, a large amount of electric charge is flowed, and, along a backward direction, electric charge is not so flowed. In an example such that a semiconductor with electron transport property and a metal are contacted, a relation between them means an electric rectifying property if indicating a relation of Fermi level of a semiconductor with electron transport property<work function of a metal.

In the present invention, if there is a relation of Fermi level of a semiconductor with electron transport property<Fermi level of a contact surface of particle, it shows a rectifying property. Since it is a backward direction in the case such that a contact surface (substrate) with respect to the particles becomes a negative potential, a negative charge flowing from the contact surface to semiconductor particles having electron transport property becomes small. On the other hand, since it is a forward direction in the case such that a contact surface (substrate) with respect to the particles becomes a positive potential, a negative charge flowing from semiconductor particles having electron transport property to the contact surface becomes large. As a result, the particles are charged in positive. In the example mentioned above, the explanation is made to a semiconductor of electron transport property, but phenomena occurred in a semiconductor with hole transport property are the same as those of the previous examples except that characteristics are reversed.

Here, in order to develop a further preferable effects, it is necessary to apply a performance in which electric charges injected by a rectifying effect are charged in the particles as properties of the particles. In addition, it is necessary to make efficiencies of charge injections effective. In order to achieve them, a surface of the base particles is formed by a metal or a metal oxide, and a semiconductor material with electron transport property or hole transport property is arranged on its surface, thereby improving these characteristics more and more. The display media constituted by these two groups of particles, wherein a material with electron transport property or a material with hole transport property is arranged on the surfaces thereof, are controlled on color tone so as to improve a contrast, and are filled between two opposed substrates.

Under such a condition, if an electric field is applied between the electrodes, it is possible to effect an excellent image display such as image.

As the base particles, use may be made of particles, a surface of which is formed by a metal or a metal oxide, for example, metal monolithic particles or particles made of metal oxide alone. Moreover, use may be made of particles in which use may be made of particles in which a surface of the particles made of resin is coated by a metal or a metal oxide, or particles in which a surface of the particles made of resin is partially coated by a metal or a metal oxide. A thickness of a semiconductor material for a surface coating (or surface partial coating) is not particularly limited, but it is preferred to be a thin film such as not larger than 100 μm, preferably not larger than 50 μm, more preferably 1 μm from the viewpoint of a charge injection efficiency. In the case of filing the particles in panel, fine particles made of silica or titanium oxide having a particle diameter smaller than that of the particles may be added by a suitable amount so as to obtain an improved fluidity.

As a producing method of the particles, if electric characteristics of electron transport property or hole transport property can be exhibited, the producing method is not particularly limited, but the following methods are preferably used. At first, use may be made of a method, in which the base particles are prepared and a surface of the base particles is coated by a semiconductor material with electron transport property or hole transport property. As a method of coating the surface, use may be made of: a method in which a dry-coat process with respect to a surface of the base particles is performed by means of vapor deposition or sputtering; a method in which the base particles are introduced into dissolved or melted semiconductor material with electron transport property or hole transport property so as to be dried and solidified; a method in which the base particles are agitated by an agitated equipment such as henschel mixer and dissolved or melted semiconductor material with electron transport property or hole transport property is immobilized therein; and a method in which a semiconductor material with electron transport property or hole transport property is dispersed in the other resin and a surface of the base particles is coated by a mixture in the same manner as mentioned above. As an another particle producing method, use may be made of: a method in which a semiconductor material with electron transport property or hole electron property is mixed and crushed with the other resin to obtain particles; and a method in which a semiconductor material with electron transport property or hole transport property is used as the particles as it is.

Among them, in the case of coating a surface of the base particles by a semiconductor material, it is preferred to use the particles in which a surface of the base particles is coated by a metal and so on. A material of the base particles is not particularly limited, but it is preferred to use normal resin, inorganic material, metal material and so on. In this case, it is preferred to display a color by the base particles, and thus it is necessary to use the particles having a color tone with excellent visibility.

In one example of the semiconductor material, firstly as an element semiconductor material, use may be made of silicon, germanium, diamond, selenium, tellurium and so on. Moreover, as a compound semiconductor, use may be made of gallium arsenide, gallium phosphide, indium arsenide, gallium aluminum arsenide, gallium aluminum indium arsenide, zinc sulfide, cadmium sulfide, cadmium selenium, cadmium tellurium, silicon carbide and so on. Further, as an oxide semiconductor, use may be made of nickel oxide (II), copper oxide (I), zinc oxide, tin oxide (IV) and so on. Moreover, use may be made of nitride semiconductor, sulfide semiconductor and so on, and some composition may be doped thereto.

Furthermore, as a low molecular organic semiconductor, use may be made of compound of anthracene series, compound of violanthrone series, compound of porphyrin series, compound of phthalocyanine series, compound of pherylene series, compound of quinone series, compound of azo series, compound of squarylium series, compound of azlenium series, compound of birylium series, compound of cyanine series, compound of aromatic amine series, compound of aromatic diamine series, compound of axadiazole series, compound of axazole series, compound of pyrozoline series, compound of aromatic methane series, compound of hydrazone series, compound of carbazole series, and their derivatives etc. Moreover, as a high molecular organic semiconductor, use may be made of polyacetylene, poly (p-phenylene), polypyrrole, polythiophene, polyamiline, poly (p-phenylene vinylene), and their derivatives etc. Further, impurities may be doped to the materials mentioned above.

A selection of these materials is not particularly limited, but it is preferred: that Fermi level satisfies the above range; that a material having an excellent stability is selected; that a material of low cost is selected; and that a material which does not affect the global environment is selected. As to Fermi level of the electrodes, a large energy gap with respect to Fermi level of the electrodes can achieve an effective charge injection.

As to a thickness of a surface coating layer, it is necessary to suppress the thickness to an extent not to decrease a charge injection efficiency by an occurrence of resistance increase due to an excessive thick thickness, and thus it is normally not greater than 10 μm, preferably not greater than 1 μm.

A second feature of the present invention is that a particle for display media is constituted by a lamination body whose surface is made of a semiconductor material and the particle for display media is used for a particle constituting the display media so as to construct an information display panel.

In the information display panel using the particles for display media according to the invention, as a substance to which the particles are contacted when moving in the panel, there are a surface of the substrate and the other particles. When they are contacted, some kind of charge occurs. As its charging mechanism, there are a contact charge, a friction charge, a peeling charge, an impact charge and so on, and they are combined in an complicated manner. It is almost impossible to completely control these charges. However, as regards a contact charge, which seems to apply a large effect with respect to charge characteristics, it is possible to control precisely to some extent.

That is, by utilizing a difference of electron energy level between respective materials, it is possible to control which side a negative charge is easy to move when for example two materials are contacted relatively. For example, a material with hole transport property, wherein a hole is a carrier, and a material with electron transport property, wherein an electron is a carrier, are a material effective for controlling a flow of charge. A state, in which these two materials are contacted, is called as p-n junction, and it is used widely for an application of diode, transistor and so on. Here, the particles for display media are considered, and a technique for maintaining a charge of the particles stably by orientating a charge moving direction due to a combination of these materials can be found out.

Hereinafter, specific examples will be explained.

Here, a construction is considered in which a material with electron transport property is arranged to a surface of the particles and a material with hole transport property is arranged under the material with electron transport property. In this case, a contact surface between these materials constitutes p-n junction, and firstly carriers are diffused in a reverse direction with each other and the re-combined. As a result, there generates a region in which a large number of carriers are decreased near the contact surface, and an electric field from the material with electron transport property to the material with hole transport property is generated corresponding to the region. In other words, an environment in which a negative charge is moved easily from the material with electron transport property to the material with hole transport property i.e. from a surface of the particle to an inner portion of the particle. In a reverse way, since a movement of a negative charge from the material with electron transport property existing in the inner portion of the particle to the material with hole transport property existing in the surface of the particle is not performed, it is possible to control a movement of a negative charge charged in the particle in a constant direction. Therefore, in the case of constituting the particle as mentioned above, it is possible to have a property in which the particle is easily charged in a negative charge stably.

When a metal is contacted to a semiconductor, a contact state becomes a rectifying contact or an ohmic contact corresponding to a relative relation of their energy levels. Here, the rectifying contact is defined as a contact state which generates a rectifying property due to a barrier at a contact portion between the metal and the semiconductor. Moreover, the ohmic contact is defined as a contact state which generates a resistance only without generating a barrier at a contact portion between the metal and the semiconductor. That is, if utilizing these properties, it is possible to control a charge charged in the particle by varying constructions of a substrate and a particle in the information display panel.

In the present invention, since a p-n junction is generated in the particle and a rectifying property is achieved there, it is preferable to be a contact state such that a charge movement from the substrate to a surface of the particle is easily performed. Therefore, if a contact state between the substrate and a surface of the particle is made to an ohmic contact, it is possible to effectively move a charge from the substrate to the particle.

On the other hand, when considering a construction of the particle mentioned above, a negative charge is easily moved from a surface of the particle made of the material with electron transport property to the substrate corresponding to a relation of a barrier height at a contact surface, if a contact state between the substrate and a surface of the particle is a rectifying contact. However, since there is a contact in the particle such that a negative charge is easily moved to an inner portion of the particle, a movement of charge is not in compliance at one direction, and thus it is not possible to achieve an effective charge movement.

In the case such that a surface is made of a material with hole transport property and an inner portion under the surface is made of a material with electron transport property, the same phenomena can be explained except that a charge is reversed. In this case, the particle exhibits a positive charge property.

A method of producing a particle is not particularly limited if electric characteristics such as electron transport property or hole transport property mentioned above can be exhibited, but use is preferably made of the following methods. Firstly, use may be made of a method in which a base particle is prepared and a surface of the base particle is coated by a semiconductor material with electron transport property or hole transport property. As a method of coating the surface, use may be made of: a method such that a surface of the base particle is dry-coated by vapor deposition or sputtering; a method such that a base particle is added in a dissolved or melted semiconductor material with electron transport property or hole transport property and then it is dried and solidified; a method such that a base particle is added and agitated in a particle agitating device such as Henshel mixer and a semiconductor material with electron transport property or hole transport property dissolved or melted in the base particle is solidified; and a method such that a semiconductor material with electron transport property or hole transport property is dispersed in the other resin to obtain a mixture and a surface of the base material is coated by the mixture. As another method of producing a particle, use may be made of a method such that a semiconductor material with electron transport property or hole transport property is kneaded and crushed with the other resin to obtain a particle, and a method such that a semiconductor material with electron transport property or hole transport property is used as it is. In the both methods, it is necessary to repeat the same method by the laminating number of a laminated body.

In the particle in which a semiconductor material with electron transport property or hole transport property is arranged to a surface thereof, it is preferred to use a base particle whose surface is coated by a metal or a metal oxide, or a particle made of a metal only or a particle made of a metal oxide only. In addition, it is preferred to use a particle in which a surface of the particle made of resin and so on is coated by a metal or a metal oxide or a particle in which a surface of the particle made of resin and so on is coated partly by a metal or a metal oxide. In this case, a thickness of a laminated body made of semiconductor materials for the surface coating (or partly surface coating) is not particularly limited, but, if considering an injection efficiency of charge, it is desirable to be a thin layer such as not larger than 100 μm, desirably not larger than 50 μm, more desirably not larger than 1 μm. When particles are filled in the panel, in order to improve a fluidity, it is preferred to add an adequate amount of fine particles having a relatively smaller diameter as that of the particle.

A material of the base particle is not particularly limited, and use may be made of normal resin, inorganic material, metal material and so on. In this case, it is preferred to exhibit a display color by the base particle, and thus it is necessary to use the particle having a color tone with excellent visibility.

As one example of a semiconductor material arranged to a surface of the particle for display media or a surface of the substrate, use may be made of silicon, germanium, diamond, selenium, tellurium and so on. Moreover, as a compound semiconductor, use may be made of gallium arsenide, gallium phosphide, indium arsenide, gallium aluminum arsenide, gallium aluminum indium arsenide, zinc sulfide, cadmium sulfide, cadmium selenium, cadmium tellurium, silicon carbide and so on. Further, as an oxide semiconductor, use may be made of nickel oxide (II), copper oxide (I), zinc oxide, tin oxide (IV) and so on. Moreover, use may be made of nitride semiconductor, sulfide semiconductor and so on, and some composition may be doped thereto.

Furthermore, as a low molecular organic semiconductor, use may be made of compound of anthracene series, compound of violanthrone series, compound of porphyrin series, compound of phthalocyanine series, compound of pherylene series, compound of quinone series, compound of azo series, compound of squarylium series, compound of azlenium series, compound of birylium series, compound of cyanine series, compound of aromatic amine series, compound of aromatic diamine series, compound of axadiazole series, compound of axazole series, compound of pyrozoline series, compound of aromatic methane series, compound of hydrazone series, compound of carbazole series, and their derivatives etc. Moreover, as a high molecular organic semiconductor, use may be made of polyacetylene, poly (p-phenylene), polypyrrole, polythiophene, polyamiline, poly (p-phenylene vinylene), and their derivatives etc. Further, impurities may be doped to the materials mentioned above.

As to a thickness of a surface coating layer, it is necessary to suppress the thickness to an extent not to decrease a charge injection efficiency by an occurrence of resistance increase due to an excessive thick thickness, and thus it is normally not greater than 10 μm, preferably not greater than 1 μm.

Hereinafter, a basic construction of the particles for display media (hereinafter, sometimes called as particles) will be explained.

The particles have preferably a spherical shape. The particle may be composed of resins as a main ingredient, and can include according to need charge control agents, coloring agent, inorganic additives and so on as is the same as the known one. Hereinafter, typical examples of resin, charge control agent, coloring agent, additive and so on will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds and colors of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline blue, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

By mixing the coloring agents mentioned above, it is possible to produce a particle for display media having a suitable color.

Moreover, as the particle diameter of the particles for display media (sometimes called as particles), it is preferred to set an average particle diameter $d(0.5)$ to 0.1-20 µm and to use even particles. If the average particle diameter $d(0.5)$ exceeds this range, the image clearness sometimes deteriorated, and, if the particle diameter is smaller than this range, an agglutination force between the particles becomes too large and the movement of the particles is prevented.

Further, it is preferred that particle diameter distribution Span of the particles for display media, which is defined by the following formula, is less 5 preferably less than 3:

$$\text{Span}=(d(0.9)-d(0.1))/d(0.5);$$

(here, $d(0.5)$ means a value of the particle diameter expressed by µm wherein an amount of the particles having the particle diameter larger than or smaller than this value is 50%, $d(0.1)$ means a value of the particle diameter expressed by µm wherein an amount of the particles having the particle diameter smaller than this value is 10%, and $d(0.9)$ means a value of the particle diameter expressed by µm wherein an amount of the particles having the particle diameter smaller than this value is 90%).

If the particle diameter distribution Span is set to not more than 5, the particle diameter becomes even and it is possible to perform an even particle movement.

Furthermore, as a correlation between the particles for display media, it is preferred to set a ratio of $d(0.5)$ of the particles having smallest diameter with respect to $d(0.5)$ of the particles having largest diameter to not more than 50 preferably not more than 10. The particles having different charge characteristics with each other are moved reversely, even if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the display media properly depends upon the measuring condition. However, it is understood that the charge amount of the display media used for the display media in the information display panel substantially depends upon an initial charge amount, a contact with respect to the partition wall, a contact with respect to the substrate, a charge decay due to an elapsed time, and specifically a saturation value of the particles for the display media during a charge behavior is a main factor.

After various investigations of the inventors, it is fond that an adequate range of the charged values of the particles for the display media can be estimated by performing a blow-off method utilizing the same carrier particles so as to measure the charge amount of the particles for the display media.

Further, in the dry-type information display panel in which the display media constituted by the particles for display media are driven in an air space, it is important to control a gas in a gap surrounding the display media between the substrates, and a suitable gas control contributes an improvement of display stability. Specifically, it is important to control a humidity of the gap gas to not more than 60% RH at 25° C., preferably not more than 50% RH.

The above gap means a gas portion surrounding the display media obtained by substituting the electrodes 5, 6 (in the case of arranging electrode inside of substrate), an occupied portion of the display media 3, an occupied portion of the partition walls 4 and a seal portion of the device from the space between the substrate 1 and the substrate 2 for example in FIGS. 1*a* and 1*b*-FIGS. 3*a* and 3*b*.

A kind of the gap gas is not limited if it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the substrate under an atmosphere having a predetermined humidity and to apply a seal member and a seal method for preventing a humidity inclusion from outside of the device.

In the information display panel according to the invention, an interval between the substrates is not restricted if the display media can be moved and a contrast can be maintained, and it is adjusted normally to 10-500 µm, preferably 10-200 µm.

Moreover, it is preferred to control a volume occupied rate of the display media in a space between the opposed substrates to 5-70%, more preferably 5-60%. If the volume occupied rate of the display media exceeds 70%, the display media become difficult to move, and if it is less than 5%, a sufficient contrast cannot be obtained and a clear image display is not performed.

Hereinafter, respective members constituting the information display panel according to the invention will be explained.

As the substrate, at least one of the substrates is the transparent substrate through which a color of the display media can be observed from outside of the panel, and it is preferred to use a material having a high transmission factor of visible light and an excellent heat resistance. The other substrate may be transparent or may be opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or so having no flexibility. The thickness of the substrate is preferably 2 to 5000 µm, more preferably 5 to 2000 µm. When the thickness is too thin, it becomes difficult to maintain strength and distance uniformity between the substrates, and when the thickness is thicker than 5000 µm, there is a drawback as a thin-type information display panel.

As a material of the electrode in case of arranging the electrode in the information display panel, use is made of metals such as aluminum, silver, nickel, copper, gold, or, conductive metal oxides such as indium tin oxide (ITO), indium oxide, conductive tin oxide, antimony tin oxide (ATO), conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed to perform pattering. A transparency is necessary for the electrode arranged to the substrate at an observation side (display surface side), but it is not necessary for the electrode arranged to the substrate at a rear side. In both cases, the materials mentioned above, which are transparent and have a pattern formation capability, can be suitably used. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode arranged to the rear substrate are the same as those of the electrode arranged to the substrate at the display side, but transparency is not necessary. In this case, the applied outer voltage may be superimposed with a direct current or an alternate current.

Figure 4:
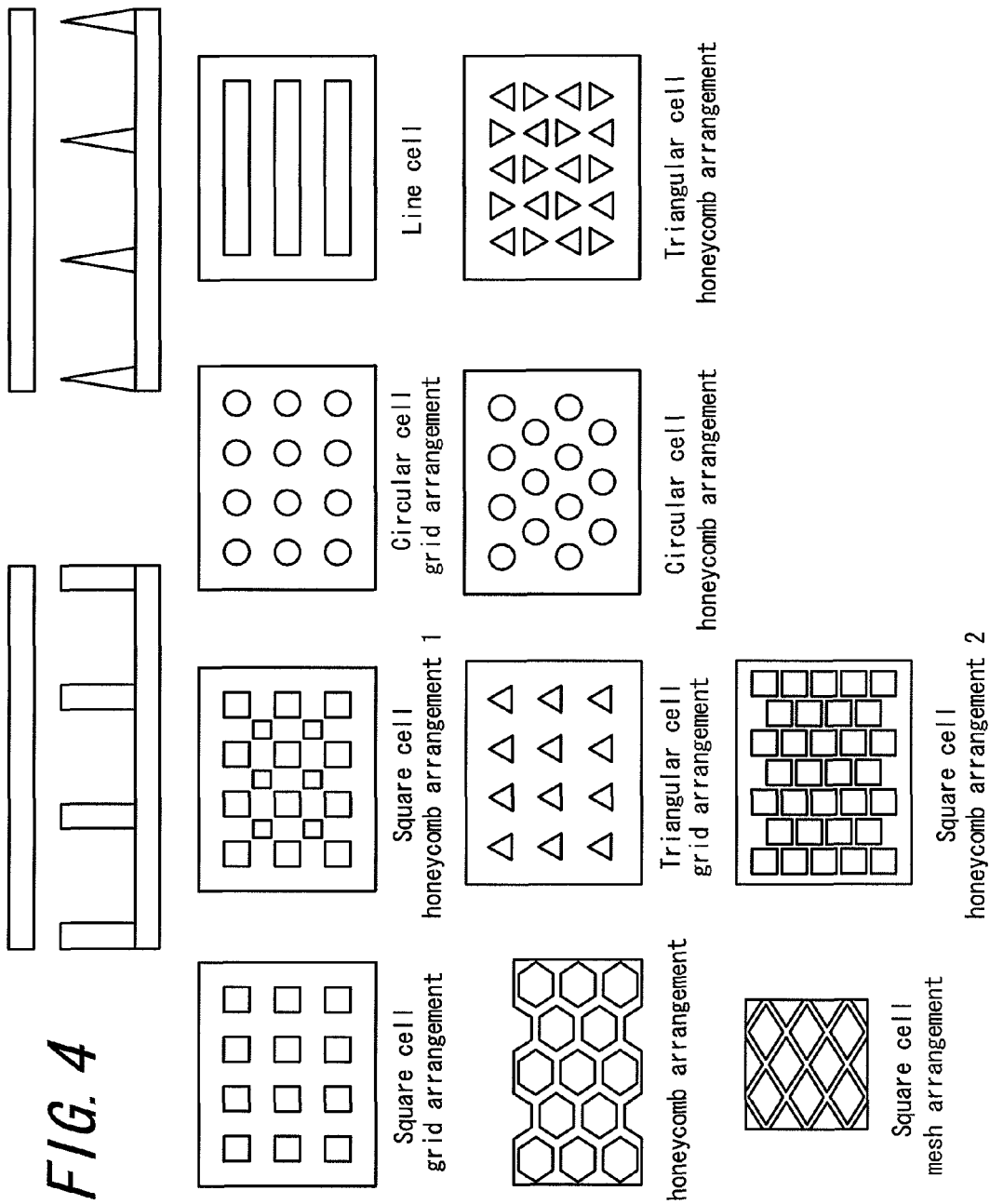
FIG. 4 is a schematic view showing one embodiment of partition shapes in the information display panel using the particles for display media according to the invention as the display media.

As the partition wall 4 arranged to the substrate according to need, a shape of the partition wall is suitably designed in accordance with a kind of the display media used for the display and is not restricted. However, it is preferred to set a width of the partition wall to 2-100 µm more preferably 3-50 µm and to set a height of the partition wall to 10-500 µm more preferably 10-200 µm. The cell formed by the partition walls each made of rib has a square shape, a triangular shape, a line shape, a circular shape and a hexagon shape, and has an arrangement such as a grid, a honeycomb and a mesh, as shown in FIG. 4 viewed from a plane surface of the substrate. It is preferred that the portion corresponding to a cross section of the partition wall observed from the display side (an area of the frame portion of the cell) should be made as small as possible. In this case, a clearness of the image display can be improved.

EXAMPLES

Hereinafter, the present invention will be explained further specifically with reference to the examples according to the invention and the comparative examples, but the present invention is not limited to the following examples.

As mentioned below, the information display panels according to examples 1-8, 11-13 and comparative examples 1-3, 11-12 were manufactured, and various characteristics of the manufactured information display panels were compared. At first, in respective examples mentioned above, a confirmation method of a rectifying contact to be utilized and a measuring method of various measures in the information display media will be explained, and then respective examples will be explained.

(Confirmation Method of Rectifying Contact)

Figure 5:
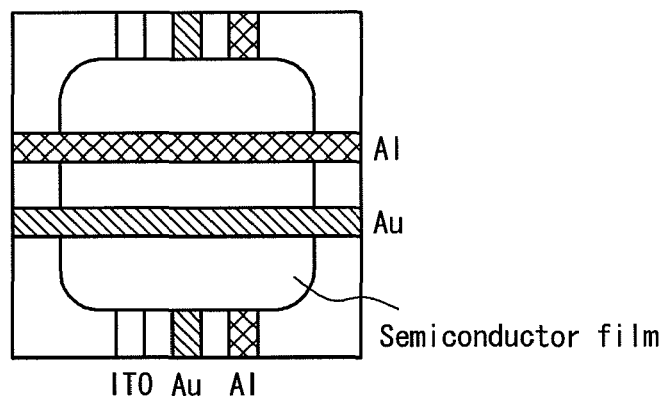
FIG. 5 is a schematic view for explaining one embodiment such that a rectifying contact of semiconductor film according to the invention is confirmed.

The confirmation of rectifying property can be performed by examining a current-voltage characteristic. At first, as shown in FIG. 5, a laminated measurement sample in which Al electrode and Au electrode were arranged to one surface of a semiconductor film and ITO electrode, Al electrode and Au electrode were arranged to the other surface of the semiconductor film. A relation of work functions of electrode materials was Al<ITO<Au. As the sample manufacturing, respective films were formed by using a vapor deposition method for the electrodes, a vapor deposition method for the semiconductor films and a spin-coat method using paint solution dissolved in arbitrary solvent.

Figure 6:
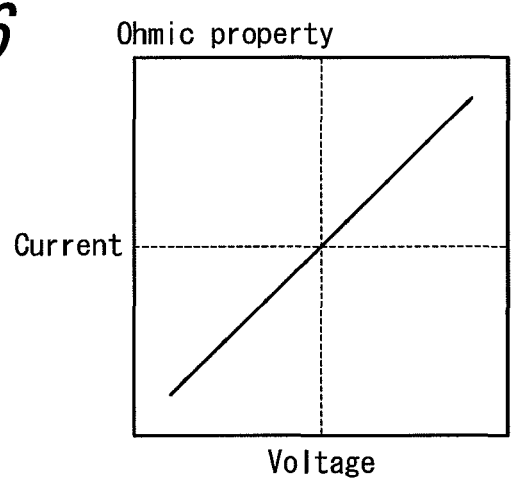
FIG. 6 is a schematic view for explaining one embodiment of a current-voltage property showing ohmic contact in the confirmation method of rectifying contact explained in FIG. 5.
Figure 7:
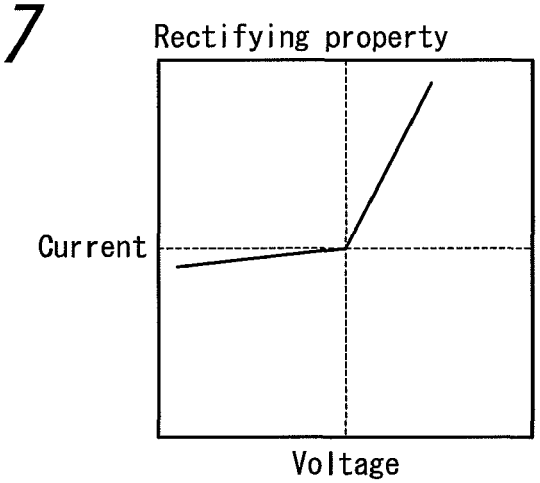
FIG. 7 is a schematic view for explaining one embodiment of a current-voltage property showing rectifying contact in the confirmation method of rectifying contact explained in FIG. 5.

Then, the semiconductor film was confirmed as a semiconductor material with electron transport property showing a rectifying contact with respect to the ITO, if the followings were satisfied: a current-voltage characteristic shows an ohmic contact as shown in FIG. 6 as one example, in the case of applying a voltage between Al and Al; a current-voltage characteristic shows a rectifying contact as shown in FIG. 7 as one example, in the case of applying a voltage between Al and ITO; and a polarity, in which ITO became a positive, was a bias in a normal direction. On the other hand, the semiconductor film was confirmed as a semiconductor material with hole transport property showing a rectifying contact with respect to the ITO, if the followings were satisfied: a current-voltage characteristic shows an ohmic contact as shown in FIG. 6 as one example, in the case of applying a voltage between Au and Au; a current-voltage characteristic shows a rectifying contact as shown in FIG. 7 as one example, in the case of applying a voltage between Au and ITO; and a polarity, in which ITO became a negative, was a bias in a normal direction.

(Measuring Method of Various Characteristics)

The average particle diameter d(0.5) and the particle diameter Span were measured according to the examples mentioned above. A coating thickness of a surface layer was measured in such a manner that the particle was cut-out and the cut-out particle was observed by using SEM with respect to the examples 1, 2, 5-8, the examples 11-13, the comparative examples 2, 3 and the comparative examples 11, 12 and by using TEM with respect to the examples 3, 4, respectively. The charge property and the charge amount were obtained in such a manner that: a display rewriting operation was repeated by 100 times in the information display panel; the information display panel was opened; and the particles adhered to the panel substrate were measured by means of Faraday cage of suction type. The contrast was obtained in such a manner that an initial display state and a display state after five million times repetitions of display rewriting by applying a voltage of ±150 V were confirmed by naked eyes. The display quality was also obtained in such a manner that an initial display state and a display state after five million times repetitions of display rewriting by applying a voltage of ±150 V were confirmed by naked eyes.

Example 1

According to the following Table 1, a particle 1 and a particle 2, in which a surface of resin particle was coated by organic semiconductor, were prepared. The prepared particle 1 and particle 2 were filled between two ITO substrates on which an electrode was arranged so as to manufacture an information display panel. A mixing rate between the particle 1 and the particle 2 was same amount (50:50), and a filling amount of these particles between the substrates was controlled to be 30 volume %. The results are shown in the following Table 1.

Example 2

According to the following Table 2, a particle 1 and a particle 2, in which a surface of resin particle was coated by organic semiconductor after a surface treatment with respect to a resin surface was performed by using a metal oxide, were prepared. A surface of resin particle, which is a base particle of the particle for display media, was subjected to a surface treatment by a vapor deposition method in such a manner that: the base particles shown in Table 2 were sprayed evenly on a plate; a surface treatment was performed by a laser vapor deposition from upward; the resin particles were slightly moved during the surface treatment so as to expose a non-treated surface; and the same surface treatment was repeated; so that a surface of the particle was evenly coated. After that, as is the same as the example 1, the prepared particle 1 and particle 2 were filled between ITO substrates so as to manufacture an information display panel. The results are shown in the following Table 2.

TABLE 1

| | | Example 1 |
|---|---|---|
| Substrate surface | | ITO |
| Particle 1 | Base particle | Acryl polymerization particle including 50 parts by weight of titanium oxide |
| | Surface semiconductor | Product of H. W. SANDS CORP. OSA1957 3,4,5-triphenyl-1,2,4-triazole Electron transport property |
| | Producing method | OSA1957: 10 g polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | 8.7 μm |
| | Particle diameter Span | 0.8 |
| | Thickness of surface layer coating | 1 μm |
| | Charge property | Positive |
| | Contact with substrate | Rectifying contact |
| Particle 2 | Base particle | Styrene polymerization particle including 5 parts by weight of carbon black |
| | Surface semiconductor | Product of H. W. SANDS CORP. OPB9241 4,4',4''-trismethyl-triphenylamine Hole transport property |
| | Producing method | Same as particle 1 (except that changing semiconductor material) |
| | Particle diameter (d0.5) | 8.5 μm |
| | Particle diameter Span | 0.9 |
| | Thickness of surface layer coating | 1 μm |
| | Charge property | Negative |
| | Contact with substrate | Rectifying contact |
| Fermi level relation | | Particle 1 < Substrate < Particle 2 |
| Display panel property | | |
| Particle 1 Charge amount | Initial | 14 μC/g |
| | After 5 million display | 11 μC/g |
| Particle 2 Charge amount | Initial | −16 μC/g |
| | After 5 million display | −12 μC/g |
| Contrast | Initial | Good |
| | After 5 million display | Good |
| Display quality | Initial | Good |
| | After 5 million display | Good |

TABLE 2

| | | Example 2 |
|---|---|---|
| Substrate surface | | ITO |
| Particle 1 | Base particle | Acryl polymerization particle including 50 parts by weight of titanium oxide |
| | Surface treatment material of base particle | SiC |
| | Surface semiconductor | Product of H.W. SANDS CORP. OSA1957<br>3,4,5-triphenyl-1,2,4-triazole<br>Electron transport property |
| | Producing method | OSA1957: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | 9 μm |
| | Particle diameter Span | 0.8 |
| | Thickness of surface coating | 1 μm |
| | Charge property | Positive |
| | Contact with substrate | Rectifying contact |
| | Fermi level relation | Surface of base particle < Surface of particle 1 < Surface of substrate |
| Particle 2 | Base particle | Styrene polymerization particle including 5 parts by weight of carbon black |
| | Surface treatment material of base particle | $SnO_2$ |
| | Surface semiconductor | Product of H.W. SANDS CORP. OPB9241<br>4,4',4''-trismethyl-triphenylamine<br>Hole transport property |
| | Producing method | Same as particle 1 (except that changing semiconductor material) |
| | Particle diameter (d0.5) | 9 μm |
| | Particle diameter Span | 0.9 |
| | Thickness of surface coating | 1 μm |
| | Charge property | Negative |
| | Contact with substrate | Rectifying contact |
| | Fermi level relation | Surface of base particle < Surface of particle 1 < Surface of substrate |
| Fermi level relation | | Particle 1 < Substrate < Particle 2 |
| Display panel property | | |
| Particle 1 Charge amount | Initial | 19 μC/g |
| | After 5 million display | 18 μC/g |
| Particle 2 Charge amount | Initial | −20 μC/g |
| | After 5 million display | −20 μC/g |
| Contrast | Initial | Good |
| | After 5 million display | Good (substantially unchanging with respect to initial state) |
| Display quality | Initial | Good |
| | After 5 million display | Good (substantially unchanging with respect to initial state) |

Example 3

According to the following Table 3, a particle 1 and a particle 2, in which a surface of the base particle was subjected to a sputtering treatment by means of a metal oxide, were prepared. As is the same as the example 1, the prepared particle 1 and particle 2 were filled between ITO substrates so as to manufacture an information display panel. The results are shown in the following Table 3.

TABLE 3

| | | Example 3 |
|---|---|---|
| Substrate surface | | ITO |
| Particle 1 | Base particle | Acryl polymerization particle including 50 parts by weight of titanium oxide |
| | Surface semiconductor | $WO_3$<br>Electron transport property |
| | Producing method | Even surface treatment was performed by filling base particles in chamber and effecting sputtering treatment while agitating particles. |
| | Particle diameter (d0.5) | 9 μm |
| | Particle diameter Span | 0.8 |
| | Thickness of surface layer coating | Several 10 nm |
| | Charge property | Positive |
| | Contact with substrate | Rectifying contact |
| Particle 2 | Base particle | Styrene polymerization particle including 5 parts by weight of carbon black |
| | Surface semiconductor | $Cu_2O$<br>Hole transport property |
| | Producing method | Same as particle 1 (except that changing semiconductor material) |
| | Particle diameter (d0.5) | 9 μm |

TABLE 3-continued

|  |  | Example 3 |
|---|---|---|
|  | Particle diameter Span | 0.9 |
|  | Thickness of surface layer coating | Several 10 nm |
|  | Charge property | Negative |
|  | Contact with substrate | Rectifying contact |
| Fermi level relation |  | Particle 1 < Substrate < Particle 2 |
| Display panel property |  |  |
| Particle 1 Charge amount | Initial | 17 μC/g |
|  | After 5 million display | 18 μC/g |
| Particle 2 Charge amount | Initial | −18 μC/g |
|  | After 5 million display | −18 μC/g |
| Contrast | Initial | Good |
|  | After 5 million display | Good (substantially unchanging with respect to initial state) |
| Display quality | Initial | Good |
|  | After 5 million display | Good (substantially unchanging with respect to initial state) |

Example 4

According to the following Table 4, a particle 1 and a particle 2 made of a semiconductor only were prepared. As it the same as the example 1, the prepared particle 1 and particle 2 were filled between ITO substrates so as to manufacture an information display panel.

TABLE 4

|  |  | Example 4 |
|---|---|---|
| Substrate surface |  | ITO |
| Particle 1 | Semiconductor particle | ZnO |
|  |  | Electron transport property |
|  | Particle diameter (d0.5) | 5 μm |
|  | Particle diameter Span | 1.2 |
|  | Charge property | Positive |
|  | Contact with substrate | Rectifying contact |
| Particle 2 | Semiconductor particle | Cu₂O |
|  |  | Hole transport property |
|  | Particle diameter (d0.5) | 2 μm |
|  | Particle diameter Span | 1.5 |
|  | Charge property | Negative |
|  | Contact with substrate | Rectifying contact |
| Fermi level relation |  | Particle 1 < Substrate < Particle 2 |

TABLE 4-continued

|  |  | Example 4 |
|---|---|---|
| Display panel property |  |  |
| Particle1 Charge amount | Initial | 9 μC/g |
|  | After 5 million display | 9 μC/g |
| Particle2 Charge amount | Initial | −11 μC/g |
|  | After 5 million display | −10 μC/g |
| Contrast | Initial | Good but slightly degrading |
|  | After 5 million display | Good but slightly degradfing |
| Display quality | Initial | Good but slightly shading |
|  | After 5 million display | Good but slightly shading |

※Here, display color was ZnO: white color and Cu₂O: orange color

Example 5

According to the following Table 5, a particle a and a particle 2, in which a semiconductor material was kneaded, crushed and classified with respect to resin, were prepared. As is the same as the example 1, the prepared particle 1 and particle 2 were filled between ITO substrates so as to manufacture an information display panel. The results are shown in the following Table 5.

TABLE 5

|  |  | Example 5 |
|---|---|---|
| Substrate surface |  | ITO |
| Particle 1 | Resin | Acryl Resin |
|  | Semiconductor material | Product of H.W. SANDS CORP. OSA1957 |
|  |  | 3,4,5-triphenyl-1,2,4-triazole |
|  |  | Electron transport property |
|  | Producing method | Particles were obtained by mixing resin, semiconductor material and pigment (carbon) at rate of rein:semiconductor material:pigment = 100:100:5, forming pellets after kneading by 2-axial extruder, finely crushing by crusher, and classifying. |
|  | Particle diameter (d0.5) | 10 μm |
|  | Particle diameter Span | 0.9 |
|  | Charge property | Positive |
|  | Contact with substrate | Rectifying contact |
| Particle 2 | Resin | Styrene resin |
|  | Surface semiconductor | Product of H.W. SANDS CORP. OPB9241 |
|  |  | 4,4',4''-trismethyl-triphenylamine |
|  |  | Hole transport property |

TABLE 5-continued

| | | Example 5 |
|---|---|---|
| | Producing method | Particles were obtained by mixing resin, semiconductor material and pigment (titanium oxide) at rate of rein:semiconductor material:pigment = 100:100:50, forming pellets after kneading by 2-axial extruder, finely crushing by crusher, and classifying. |
| | Particle diameter (d0.5) | 10 μm |
| | Particle diameter Span | 0.9 |
| | Charge property | Negative |
| | Contact with substrate | Rectifying contact |
| Fermi level relation | | Particle 1 < Substrate < Particle 2 |
| | Display panel property | |
| Particle 1 Charge amount | Initial | 12 μC/g |
| | After 5 million display | 10 μC/g |
| Particle 2 Charge amount | Initial | −14 μC/g |
| | After 5 million display | −12 μC/g |
| Contrast | Initial | Good |
| | After 5 million display | Good |
| Display quality | Initial | Good |
| | After 5 million display | Good |

Example 6

According to the following Table 6, a particle 1 and a particle 2 were prepared in such a manner that, as a particle 1, use was made of the particle 1 in the example 1 as it was, and, as a particle 2, an external additive was added to the particle 2 in the example 1. The addition of the external additive was performed in such a manner that: the external additive shown in Table 6 was mixed to obtain a mixture; the mixture was dispersed evenly by Henschel mixer; and the external additive adhered to a surface of the particle. As is the same as the example 1, the prepared particle 1 and particle 2 were filled between ITO substrates so as to manufacture an information display panel. The results are shown in the following Table 6.

TABLE 6

| | | | Example 6 |
|---|---|---|---|
| Substrate surface | | | ITO |
| Particle 1 | Base particle | | Acryl polymerization particle including 50 parts by weight of titanium oxide |
| | Surface semiconductor | | Product of H.W. SANDS CORP. OSA1957<br>3,4,5-triphenyl-1,2,4-triazole<br>Electron transport property |
| | Producing method | | OSA1957: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | | 8.7 μm |
| | Particle diameter Span | | 0.8 |
| | Thickness of surface layer coating | | 1 μm |
| | Charge property | | Positive |
| | Contact with substrate | | Rectifying contact |
| Particle 2 | Base particle | | Styrene polymerization particle including 5 parts by weight of carbon black |
| | Surface semiconductor | | Product of H.W. SANDS CORP. OPB9241<br>4,4',4''-trismethyl-triphenylamine<br>Hole transport property |
| | Producing method | | Same as particle 1 (except that changing semiconductor material) |
| | Particle diameter (d0.5) | | 8.5 μm |
| | Particle diameter Span | | 0.9 |
| | Thickness of surface layer coating | | 1 μm |
| | Charge property | | Negative |
| | Contact with substrate | | Rectifying contact |
| | External additive | | Waker Chemie hydrophobic silica H3004: 2 weight % |
| Fermi level relation | | | Particle 1 < Substrate < Particle 2 |
| | Display panel property | | |
| Particle 1 Charge amount | Initial | | 10 μC/g |
| | After 5 million display | | 9 μC/g |
| Particle 2 Charge amount | Initial | | −12 μC/g |
| | After 5 million display | | −10 μC/g |

TABLE 6-continued

|  |  | Example 6 |
|---|---|---|
| Contrast | Initial | Good |
|  | After 5 million display | Good |
| Display quality | Initial | Good |
|  | After 5 million display | Good |

Example 7

According to the following Table 7, a particle 1 and a particle 2 were prepared in such a manner that, as a particle 1, use was made of the particle 1 in the example 1 as it was, and, as a particle 2, use was made of a particle whose surface does not have an electric characteristic of semiconductor. As is the same as the example 1, the prepared particle 1 and particle 2 were filled between ITO substrates so as to manufacture an information display panel. The results are shown in the following Table 7.

Example 8

According to the following Table 8, a particle 1 and a particle 2 were prepared in such a manner that, as a particle 1, use was made of the particle 1 in the example 1 as it was, and, as a particle 2, use was made of a particle whose surface does not have an electric characteristic of semiconductor. As is the same as the example 1, the prepared particle 1 and particle 2 were filled between ITO substrates so as to manufacture an information display panel. The results are shown in the following Table 8.

TABLE 7

|  |  | Example 7 |
|---|---|---|
| Substrate surface |  | ITO |
| Particle 1 | Base particle | Acryl polymerization particle including 50 parts by weight of titanium oxide |
|  | Surface semiconductor | Product of H.W. SANDS CORP. OSA1957<br>3,4,5-triphenyl-1,2,4-triazole<br>Electron transport property |
|  | Producing method | OSA1957: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
|  | Particle diameter (d0.5) | 8.7 μm |
|  | Particle diameter Span | 0.8 |
|  | Thickness of surface layer coating | 1 μm |
|  | Charge property | Positive |
|  | Contact with substrate | Rectifying contact |
| Particle 2 | Particle | Acryl-Styrene copolymerization particle<br>3 parts by weight of carbon black<br>Charge control agent: metal complex of salicylic acid (Bontron E88, product of Orient Chemical) |
|  | Producing method | Produced by polymerization method |
|  | Particle diameter (d0.5) | 9 μm |
|  | Particle diameter Span | 0.9 |
|  | Charge property | Negative |
|  | Display panel property |  |
| Particle 1 Charge amount | Initial | 15 μC/g |
|  | After 5 million display | 10 μC/g |
| Particle 2 Charge amount | Initial | −18 μC/g |
|  | After 5 million display | −10 μC/g |
| Contrast | Initial | Good |
|  | After 5 million display | Good |
| Display quality | Initial | Good |
|  | After 5 million display | Good |

TABLE 8

| | | Example 8 |
|---|---|---|
| Substrate surface | | ITO |
| Particle 1 | Base particle | Acryl polymerization particle including 50 parts by weight of titanium oxide |
| | Surface semiconductor | Product of H.W. SANDS CORP. OSA1957 3,4,5-triphenyl-1,2,4-triazole Electron transport property |
| | Producing method | OSA1957: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | 9 μm |
| | Particle diameter Span | 0.8 |
| | Thickness of surface layer coating | 1 μm |
| | Charge property | Positive |
| | Contact with substrate | Rectifying contact |
| | Fermi level relation | Surface of base particle < Surface of particle 1 < Surface of substrate |
| Particle 2 | Particle | Acryl-Styrene copolymerization particle 3 parts by weight of carbon black 1 part by weight of charge control agent: metal complex of salicylic acid (Bontron E88, product of Orient Chemical) |
| | Producing method | Produced by polymerization method |
| | Particle diameter (d0.5) | 9 μm |
| | Particle diameter Span | 0.9 |
| | Charge property | Negative |
| Display panel property | | |
| Particle 1 Charge amount | Initial | 20 μC/g |
| | After 5 million display | 18 μC/g |
| Particle 2 Charge amount | Initial | −19 μC/g |
| | After 5 million display | −16 μC/g |
| Contrast | Initial | Good |
| | After 5 million display | Good (substantially unchanging with respect to initial state) |
| Display quality | Initial | Good |
| | After 5 million display | Good (substantially unchanging with respect to initial state) |

Comparative Example 1

According to the following Table 9, a particle 1 and a particle 2, in which no semiconductor treatment was performed in the example 1, were prepared. As is the same as the example 1, the prepared particle 1 and particle 2 were filled between ITO substrates so as to manufacture an information display panel. The results are shown in the following Table 9.

TABLE 9

| | | Comparative example 1 |
|---|---|---|
| Substrate surface | | ITO |
| Particle 1 | Base particle | Acryl polymerization particle including 50 parts by weight of titanium oxide |
| | Surface semiconductor | None |
| | Particle diameter (d0.5) | 7.6 μm |
| | Particle diameter Span | 0.8 |
| | Charge property | Positive |
| Particle 2 | Base particle | Styrene polymerization particle including 5 parts by weight of carbon black |
| | Surface semiconductor | None |
| | Particle diameter (d0.5) | 7.3 μm |
| | Particle diameter Span | 0.9 |
| | Charge property | Negative |
| Display panel property | | |
| Particle 1 Charge amount | Initial | 23 μC/g |
| | After 5 million display | 5 μC/g |
| Particle 2 Charge amount | Initial | −27 μC/g |
| | After 5 million display | −6 μC/g |
| Contrast | Initial | Good but driving voltage was high |
| | After 5 million display | Cannot display |
| Display quality | Initial | Good |
| | After 5 million display | Cannot display |

Comparative Example 2

According to the following Table 10, a particle 1 and a particle 2, in which a surface of the base resin particle was coated by organic semiconductor so as to obtain an ohmic contact, were prepared. As is the same as the example 1, the prepared particle 1 and particle 2 were filled between ITO substrates so as to manufacture an information display panel. The results are shown in the following Table 10.

TABLE 10

| | | Comparative example 2 |
|---|---|---|
| Substrate surface | | ITO |
| Particle 1 | Base particle | Acryl polymerization particle including 50 parts by weight of titanium oxide |
| | Surface semiconductor | Product of H.W. SANDS CORP. OSA7940<br>4,4'-bis-(N,N-diphenylamino)quaterphenyl<br>Hole transport property |
| | Producing method | OSA7940: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | 8.4 μm |
| | Particle diameter Span | 0.8 |
| | Thickness of surface layer coating | 1 μm |
| | Charge property | Positive |
| | Contact with substrate | Ohmic contact |
| Particle 2 | Base particle | Styrene polymerization particle including 5 parts by weight of carbon black |
| | Surface semiconductor | Product of H.W. SANDS CORP. OSA3972<br>2,9-dimethyl-4,7-diphenyl-1,10-phenanthroline<br>Electron transport property |
| | Producing method | Same as particle 1 (except that changing semiconductor material) |
| | Particle diameter (d0.5) | 8.2 μm |
| | Particle diameter Span | 0.9 |
| | Thickness of surface layer coating | 1 μm |
| | Charge property | Negative |
| | Contact with substrate | Ohmic contact |
| Fermi level relation | | Particle 1 > Substrate > Particle 2 |
| Display panel property | | |
| Particle 1 Charge amount | Initial | 13 μC/g |
| | After 5 million display | 9 μC/g |
| Particle 2 Charge amount | Initial | −15 μC/g |
| | After 5 million display | −9 μC/g |
| Contrast | Initial | Good |
| | After 5 million display | Slight contrast decrease |
| Display quality | Initial | Good |
| | After 5 million display | Slight shading |

Comparative Example 3

According to the following Table 11, a particle 1 and a particle 2, in which Fermi level of the particle constructions was reversed to the example of the present invention, were prepared in such a manner that a surface of the base resin particle was subjected to a surface treatment by means of a metal oxide and then it was coated by organic semiconductor. A surface treatment of the base particle was performed in such a manner that the base particles were sprayed evenly on a plate and a surface treatment was performed by a laser vapor deposition from upward. Then, the resin particles were slightly moved so as to expose a non-treated surface and the same surface treatment was performed. By repeating the operation, a surface of the base particle was evenly coated by a vapor deposition. As is the same as the example 1, the prepared particle 1 and particle 2 were filled between ITO substrates so as to manufacture an information display panel. The results are shown in the following Table 11.

TABLE 11

| | | Comparative example 3 |
|---|---|---|
| Substrate surface | | ITO |
| Particle 1 | Base particle | Acryl polymerization particle including 50 parts by weight of titanium oxide |
| | Surface treatment material of base particle | $SnO_2$ |
| | Surface semiconductor | Product of H.W. SANDS CORP. OSA1957<br>3,4,5-triphenyl-1,2,4-triazole<br>Electron transport property |
| | Producing method | OSA1957: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | 9 μm |
| | Particle diameter Span | 0.8 |
| | Thickness of surface layer coating | 1 μm |
| | Charge property | Positive |
| | Contact with substrate | Rectifying contact |

TABLE 11-continued

|  |  | Comparative example 3 |
|---|---|---|
| | Fermi level relation | Surface of base particle > Surface of particle |
| | | Surface of particle < Surface substrate |
| Particle 2 | Base particle | Styrene polymerization particle including 5 parts by weight of carbon black |
| | Surface treatment material of base particle | SiC |
| | Surface semiconductor | Product of H.W. SANDS CORP. OSA9241 |
| | | 4,4′,4″-trismethyl triphenylamine |
| | | Hole transport property |
| | Producing method | Same as particle 1 (except that changing semiconductor material) |
| | Particle diameter (d0.5) | 9 μm |
| | Particle diameter Span | 0.9 |
| | Thickness of surface layer coating | 1 μm |
| | Charge property | Negative |
| | Contact with substrate | Rectifying contact |
| | Fermi level relation | Surface of base particle < Surface of particle |
| | | Surface of particle > Surface substrate |
| Fermi level relation | | Surface of particle 1 < Substrate < Surface of particle 2 |
| | Display panel property | |
| Particle 1 Charge amount | Initial | 15 μC/g |
| | After 5 million display | 8 μC/g |
| Particle 2 Charge amount | Initial | −16 μC/g |
| | After 5 million display | −9 μC/g |
| Contrast | Initial | Good |
| | After 5 million display | Slight contrast decrease |
| Display quality | Initial | Good |
| | After 5 million display | Slight shading |

From the results mentioned above, it is understood that the examples 1-8 according to the invention are superior to the comparative examples 1-3 on charge amount, contrast and display quality at initial and after 5 million display respectively. Moreover, among the examples, it is understood that the example 6 can operate under a low driving voltage.

Example 11

According to the following Table 12, a particle 1, in which a surface was a laminated body formed in such a manner that a base particle was subjected to a surface treatment by using $Cu_2O$ and a semiconductor layer was coated thereon, and, a particle 2, in which a surface was a laminated body formed in such a manner that a base particle was subjected to a surface treatment by using ZnO and a semiconductor layer was coated thereon, were prepared. The surface treatment using $Cu_2O$ and ZnO was performed in such a manner that the base particles were sprayed evenly on a plate and a surface treatment was performed by a laser vapor deposition from upward. Then, the resin particles were slightly moved so as to expose a non-treated surface and the same surface treatment was performed. By repeating the operation, a surface of the base particle was evenly coated by a vapor deposition. The prepared particle 1 and particle 2 were filled between two ITO substrates on which an electrode was arranged so as to manufacture an information display panel. A mixing rate between the particle 1 and the particle 2 was same amount (50:50), and a filling amount of these particles between the substrates was controlled to be 30 volume %. The results are shown in the following Table 12.

TABLE 12

|  |  | Example 11 |
|---|---|---|
| Substrate surface | | ITO |
| Particle1 | Base particle | Acryl polymerization particle including 50 parts by weight of titanium oxide |
| | Surface treatment material of base particle | $Cu_2O$ |
| | | Hole transport property |
| | Surface semiconductor | Product of H.W. SANDS CORP. OSA3972 |
| | | 2,9-dimethyl-4,7-diphenyl-1,10-phenanthroline |
| | | Electron transport property |
| | Producing method | OSA3972: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | 9 μm |
| | Particle diameter Span | 0.8 |
| | Thickness of surface layer coating | 1 μm |
| | Charge property | Negative |
| | Contact with substrate | Ohmic contact |

TABLE 12-continued

|  |  | Example 11 |
|---|---|---|
| Particle2 | Base particle | Styrene polymerization particle including 5 parts by weight of carbon black |
|  | Surface treatment material of base particle | ZnO<br>Electron transport property |
|  | Surface semiconductor | Product of H.W. SANDS CORP. OSA7940<br>4,4'-bis-(N,N-diphenylamino)quaterphenyl<br>Hole transport property |
|  | Producing method | Same as particle 1 (except that changing semiconductor material) |
|  | Particle diameter (d0.5) | 9 μm |
|  | Particle diameter Span | 0.9 |
|  | Thickness of surface layer coating | 1 μm |
|  | Charge property | Positive |
|  | Contact with substrate | Ohmic contact |
|  | Display panel property |  |
| Particle 1 Charge amount | Initial | −17 μC/g |
|  | After 5 million display | −15 μC/g |
| Particle 2 Charge amount | Initial | 18 μC/g |
|  | After 5 million display | 16 μC/g |
| Contrast | Initial | Good |
|  | After 5 million display | Good (substantially unchanging with respect to initial state) |
| Display quality | Initial | Good |
|  | After 5 million display | Good (substantially unchanging with respect to initial state) |

Example 12

According to the following Table 13, a particle 1 and a particle 2 were prepared in such a manner that, as a particle 2, use was made of the particle 2 in the example 11 as it was, and, as a particle 1, an external additive was added to the particle 1 in the example 11. The addition of the external additive was performed in such a manner that: the external additive shown in Table 13 was mixed to obtain a mixture; the mixture was dispersed evenly by Henschel mixer; and the external additive adhered to a surface of the particle. After that, as is the same as the example 11, the prepared particle 1 and particle 2 were filled between ITO substrates so as to manufacture an information display panel. The results are shown in the following Table 13.

TABLE 13

|  |  |  | Example 12 |
|---|---|---|---|
| Substrate surface |  |  | ITO |
|  | Particle 1 | Base particle | Acryl polymerization particle including 50 parts by weight of titanium oxide |
|  |  | Surface treatment material of base particle | Cu$_2$O<br>Hole transport property |
|  |  | Surface semiconductor | Product of H.W. SANDS CORP. OSA3972<br>2,9-dimethyl-4,7-diphenyl-1,10-phenanthroline<br>Electron transport property |
|  |  | Producing method | OSA3972: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
|  |  | Particle diameter (d0.5) | 9 μm |
|  |  | Particle diameter Span | 0.8 |
|  |  | Thickness of surface layer coating | 1 μm |
|  |  | Charge property | Negative |
|  |  | Contact with substrate | Ohmic contact |
|  |  | External additive | Waker Chemie hydrophobic silica H3004: 2 weight % |
|  | Particle 2 | Base particle | Styrene polymerization particle including 5 parts by weight of carbon black |
|  |  | Surface treatment material of base particle | ZnO<br>Electron transport property |
|  |  | Surface semiconductor | Product of H.W. SANDS CORP. OSA7940<br>4,4'-bis-(N,N-diphenylamino)quaterphenyl<br>Hole transport property |
|  |  | Producing method | Same as particle 1 (except that changing semiconductor material) |
|  |  | Particle diameter (d0.5) | 9 μm |
|  |  | Particle diameter Span | 0.9 |
|  |  | Thickness of surface layer coating | 1 μm |
|  |  | Charge property | Positive |
|  |  | Contact with substrate | Ohmic contact |

TABLE 13-continued

| | | Example 12 |
|---|---|---|
| Display panel property | | |
| Particle 1 Charge amount | Initial | −15 μC/g |
| | After 5 million display | −13 μC/g |
| Particle 2 Charge amount | Initial | 16 μC/g |
| | After 5 million display | 14 μC/g |
| Contrast | Initial | Good |
| | After 5 million display | Good (substantially unchanging with respect to initial state) |
| Display quality | Initial | Good |
| | After 5 million display | Good (substantially unchanging with respect to initial state) |

Example 13

According to the following Table 14, a particle 1 and a particle 2 were prepared in such a manner that, as a particle 1, use was made of the particle 1 in the example 11 as it was, and, as a particle 2, use was made of a particle whose surface does not have an electric characteristic of semiconductor. As is the same as the example 11, the prepared particle 1 and particle 2 were filled between ITO substrates so as to manufacture an information display panel. The results are shown in the following Table 14.

Comparative Example 11

According to the following Table 15, a particle 1 and a particle 2, in which no semiconductor treatment was performed in the example 11, were prepared. As is the same as the example 11, the prepared particle 1 and particle 2 were filled between ITO substrates so as to manufacture an information display panel. The results are shown in the following Table 15.

TABLE 14

| | | Example 13 |
|---|---|---|
| Substrate surface | | ITO |
| Particle 1 | Base particle | Acryl polymerization particle including 50 parts by weight of titanium oxide |
| | Surface treatment material of base particle | Cu$_2$O<br>Hole transport property |
| | Surface semiconductor | Product of H.W. SANDS CORP. OSA3972<br>2,9-dimethyl-4,7-diphenyl-1,10-phenanthroline<br>Electron transport property |
| | Producing method | OSA3972: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | 9 μm |
| | Particle diameter Span | 0.8 |
| | Thickness of surface layer coating | 1 μm |
| | Charge property | Negative |
| | Contact with substrate | Ohmic contact |
| Particle 2 | Particle | Acryl-Styrene copolymerization particle<br>3 parts by weight of carbon black<br>1 part by weight of charge control agent: azene compound (Bontron E07, product of Orient Chemical) |
| | Producing method | Produced by polymerization method |
| | Particle diameter (d0.5) | 9 μm |
| | Particle diameter Span | 0.9 |
| | Charge property | Positive |
| Display panel property | | |
| Particle 1 Charge amount | Initial | −18 μC/g |
| | After 5 million display | −14 μC/g |
| Particle 2 Charge amount | Initial | 20 μC/g |
| | After 5 million display | 15 μC/g |
| Contrast | Initial | Good |
| | After 5 million display | Good (substantially unchanging with respect to initial state) |
| Display quality | Initial | Good |
| | After 5 million display | Good (substantially unchanging with respect to initial state) |

TABLE 15

| | | Comparative example 11 |
|---|---|---|
| Substrate surface | | ITO |
| Particle 1 | Base particle | Acryl polymerization particle including 50 parts by weight of titanium oxide |
| | Surface semiconductor | None |
| | Particle diameter(d0.5) | 7.6 μm |
| | Particle diameter Span | 0.8 |
| | Charge property | Positive |
| Particle 2 | Base particle | Styrene polymerization particle including 5 parts by weight of carbon black |
| | Surface semiconductor | None |
| | Particle diameter (d0.5) | 7.3 μm |
| | Particle diameter Span | 0.9 |
| | Charge property | Negative |
| Display panel property | | |
| Particle 1 Charge amount | Initial | 23 μC/g |
| | After 5 million display | 5 μC/g |
| Particle 2 Charge amount | Initial | −27 μC/g |
| | After 5 million display | −6 μC/g |
| Contrast | Initial | Good but driving voltage was high |
| | After 5 million display | Cannot display |
| Display quality | Initial | Good |
| | After 5 million display | Cannot display |

Comparative Example 12

According to the following Table 16, a particle 1, which was constructed by a material with electron transport property together with a surface laminated body, and, a particle 2, which was constructed by a material with hole transport property together with a surface laminated body, were prepared. As is the same as the example 11, the prepared particle 1 and particle 2 were filled between ITO substrates so as to manufacture an information display panel. The results are shown in the following Table 16.

TABLE 16

| | | Comparative example 12 |
|---|---|---|
| Substrate surface | | ITO |
| Particle 1 | Base particle | Acryl polymerization particle including 50 parts by weight of titanium oxide |
| | Surface treatment material of base particle | ZnO Electron transport property |
| | Surface semiconductor | Product of H.W. SANDS CORP. OSA3972 2,9-dimethyl-4,7-diphenyl-1,10-phenanthroline Electron transport property |
| | Producing method | OSA3972: 10 g, polycarbonate resin: 10 g were dissolved into dichloromethane: 380 g, base particles 300 g were added into dissolved solution, and it was sufficiently agitated. After that, it was dried by spray dryer. Obtained particles were roughly crushed and classified to obtain particles. |
| | Particle diameter (d0.5) | 9 μm |
| | Particle diameter Span | 0.8 |
| | Thickness of surface layer coating | 1 μm |
| | Charge property | Negative |
| | Contact with substrate | Ohmic contact |
| Particle JI1 | Base particle | Styrene polymerization particle including 5 parts by weight of carbon black |
| | Surface treatment material of base particle | $Cu_2O$ Hole transport property |
| | Surface semiconductor | Product of H.W. SANDS CORP. OSA7940 4,4'-bis-(N,N-diphenylamino)quaterphenyl Hole transport property |
| | Producing method | Same as particle 1 (except that changing semiconductor material) |
| | Particle diameter (d0.5) | 9 μm |
| | Particle diameter Span | 0.9 |
| | Charge property | Positive |
| | Contact with substrate | Ohmic contact |
| Display panel property | | |
| Particle 1 Charge amount | Initial | −15 μC/g |
| | After 5 million display | −9 μC/g |
| Particle 2 Charge amount | Initial | 15 μC/g |
| | After 5 million display | 8 μC/g |
| Contrast | Initial | Good |
| | After 5 million display | Slight decrease |
| Display quality | Initial | Good |
| | After 5 million display | Slight shading |

From the results mentioned above, it is understood that the examples 11-13 according to the invention are superior to the comparative examples 11, 12 on charge amount, contrast and display quality at initial and after 5 million display respectively. Moreover, among the examples, it is understood that the example 12 can operate under a low driving voltage.

INDUSTRIAL APPLICABILITY

The information display device utilizing the particles for display media according to the invention is applicable to the display unit for mobile equipment such as notebook personal computers, PDAs, cellular phones, handy terminal and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric advertisement, information board, electric POP (Point Of Presence, Point Of Purchase advertising), electric price tag, electric shelf tag, electric musical score, RF-ID device and so on.

The invention claimed is:

1. Particles for display media used for an information display panel, in which at least one group of display media are sealed between two opposed substrates, at least one of two substrates being transparent, and, in which the display media, to which an electrostatic field is applied, are made to move so as to display information such as an image, characterized in that a material having electric properties of a semiconductor is provided on a surface of the particles;

wherein the surface of the particles is a laminated body of semiconductor materials.

2. The particles for display media according to claim 1, wherein a surface of at least one group of the particles is constituted by a material of electron transport property and an under layer of the surface is constituted by a material of hole transport property.

3. The particles for display media according to claim 2, wherein the particles show a negative charge characteristic.

4. The particles for display media according to claim 1, wherein a surface of at least one group of the particles is constituted by a material of hole transport property and an under layer of the surface is constituted by a material of electron transport property.

5. The particles for display media according to claim 4, wherein the particles show a positive charge characteristic.

6. The particles for display media according to any of claims 1, 2, 3, 4, and 5, wherein the substrate and the particle surface are an ohmic contact.

7. An information display panel, in which at least one group of display media are sealed between two opposed substrates, at least one of two substrates being transparent, and, in which the display media, to which an electrostatic field is applied, are made to move so as to display information such as an image, characterized in that display media constituted by the particles for display media set forth in claim 1 are used.

8. The particles for display media according to claim 1, wherein the material having electric properties of a semiconductor is a material having electron transport property.

9. The particles for display media according to claim 1, wherein the material having electric properties of a semiconductor is a material having hole transport property.

10. The particles for display media according to claim 8, wherein a particle surface having electric properties of electron transport property has an electric rectifying contact relation with respect to a contact surface of at least one of two opposed substrates.

11. The particles for display media according to claim 9, wherein a particle surface having electric properties of hole transport property has an electric rectifying contact relation with respect to a contact surface of at least one of two opposed substrates.

12. The particles for display media according to claim 1, wherein the particles having a particle surface of electric properties of electron transport property and the particles having a particle surface of electric properties of hole transport property, both particles having different charge characteristics with each other, are used together.

13. The particles for display media according to claim 12, wherein, if it is assumed that Fa is Fermi level on a surface of particles A having the particle surface of electric transport property, Fb is Fermi level on a surface of particles B having the particle surface of hole transport property, and Fs is Fermi level on a surface of the substrate to which the particles are contacted, the following relation is satisfied:

$Fa < Fs < Fb$.

14. The particles for display media according to claim 1, wherein a charge characteristic of the particles having the particle surface of electric properties of electron transport property is positive.

15. The particles for display media according to claim 1, wherein a charge characteristic of the particles having the particle surface of electric properties of hole transport property is negative.

16. The particles for display media according to claim 1, wherein the particles are formed in such a manner that a surface of base particles is coated by a material having electron transport property or hole transport property.

17. The particles for display media according to claim 16, wherein the material coated on the surface of the base particles is a metal or a metal oxide.

18. The particles for display media according to claim 16, wherein, if it is assumed that Fc is Fermi level on a surface of the base particles having the particle surface of electric transport property, Fa is Fermi level on the particle surface, and Fs is Fermi level on a surface of the substrate to which the particles are contacted, the following relation is satisfied:

$Fc < Fa < Fs$.

19. The particles for display media according to claim 16, wherein, if it is assumed that Fc is Fermi level on a surface of the base particles having the particle surface of hole transport property, Fa is Fermi level on the particle surface, and Fs is Fermi level on a surface of the substrate to which the particles are contacted, the following relation is satisfied:

$Fc < Fa < Fs$.

20. The particles for display media according to claim 1, wherein the particles are constituted by a simple body of the material of electron transport property or the material of hole transport property.

21. The particles for display media according to claim 1, wherein the particles are constituted by dispersing the material of electron transport property or the material of hole transport property into a resin.

22. The particles for display media according to claim 1, wherein the laminated body comprises a vapor deposited laminated body.

23. The particles for display media according to claim 1, wherein the laminated body comprises a sputtered laminated body.

* * * * *